United States Patent
Kojima (10) Patent No.: US 8,063,953 B2
(45) Date of Patent: Nov. 22, 2011

(54) IMAGE DISPLAY CONTROLLING DEVICE FOR DISPLAYING AN IMAGE BELONGING TO A FILE IMAGE GROUP, IMAGING DEVICE FOR DISPLAYING AN IMAGE BELONGING TO A FILE IMAGE GROUP, AND IMAGE DISPLAY METHOD FOR DISPLAYING AN IMAGE BELONGING TO A FILE IMAGE GROUP

(75) Inventor: Takayoshi Kojima, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 275 days.

(21) Appl. No.: 11/904,694

(22) Filed: Sep. 28, 2007

(65) Prior Publication Data

US 2008/0079823 A1   Apr. 3, 2008

(30) Foreign Application Priority Data

Sep. 28, 2006 (JP) .................. 2006-264473
Jul. 17, 2007 (JP) .................. 2007-185814

(51) Int. Cl.
*H04N 5/76* (2006.01)

(52) U.S. Cl. .............. 348/231.99; 348/231.2; 348/231.3

(58) Field of Classification Search .. 348/231.99–231.9; 382/225
See application file for complete search history.

(56) References Cited

U.S. PATENT DOCUMENTS

| | | |
|---|---|---|
| 6,608,650 B1 | 8/2003 | Torres et al. |
| 7,106,375 B2 | 9/2006 | Venturino et al. |
| 7,193,646 B1 * | 3/2007 | Shioji ........................ 348/220.1 |
| 7,589,767 B2 | 9/2009 | Ishibashi et al. |
| 2001/0023436 A1 | 9/2001 | Srinivasan et al. |
| 2003/0011687 A1 * | 1/2003 | Imura et al. ................. 348/231.2 |
| 2003/0112357 A1 * | 6/2003 | Anderson ................ 348/333.05 |

(Continued)

FOREIGN PATENT DOCUMENTS

JP       2002-281367        9/2002

(Continued)

OTHER PUBLICATIONS

English Language Abstract of Machine Translation of Japanese Publication No. JP2005-033468 A (7 pages).

(Continued)

*Primary Examiner* — David Ometz
*Assistant Examiner* — Dwight C Tejano
(74) *Attorney, Agent, or Firm* — Nutter McClennen & Fish LLP; John J. Penny, Jr.; Christina M. Sperry (57) ABSTRACT

In a digital camera, it is checked whether a stored image file belongs to an image file group including a pre-development RAW file and a JPEG file generated by developing the RAW file. When the storage image file belongs to an image file group, an image belonging to the image file group and an image of a single image file not belonging to any image file group are displayed in distinguishable modes in an image selection screen so that a user can select either one of these images. Furthermore, text representing information regarding the image file group or the single image file is displayed, such as information indicating a file type that a displayed image corresponds to, or information including a name of a developing device. As described above, only an image among images of an image file group is displayed, and information regarding the image file is displayed.

12 Claims, 7 Drawing Sheets

U.S. PATENT DOCUMENTS

| | | | |
|---|---|---|---|
| 2003/0169349 A1* | 9/2003 | Aoi et al. | 348/231.2 |
| 2003/0189652 A1* | 10/2003 | Takayama | 348/231.99 |
| 2004/0264810 A1* | 12/2004 | Taugher et al. | 382/305 |
| 2005/0097475 A1 | 5/2005 | Makioka et al. | |
| 2005/0105806 A1* | 5/2005 | Nagaoka et al. | 382/224 |
| 2006/0268126 A1* | 11/2006 | Ishibashi et al. | 348/231.99 |
| 2006/0279645 A1* | 12/2006 | Ishibashi et al. | 348/231.99 |
| 2009/0037605 A1 | 2/2009 | Li | |

FOREIGN PATENT DOCUMENTS

| | | |
|---|---|---|
| JP | 2004-104601 A | 4/2004 |
| JP | 2004-247873 | 9/2004 |
| JP | 2005-033468 A | 2/2005 |
| JP | 2005-176272 A | 6/2005 |
| JP | 2005354527 A | 12/2005 |
| JP | 2006042004 A | 2/2006 |
| JP | 2007189428 A | 7/2007 |
| KR | 2006-0125543 | 6/2006 |

OTHER PUBLICATIONS

English Language Abstract of Machine Translation of Japanese Publication No. JP2004-104601 A. (14 pages).

English Language Abstract of Machine Translation of Japanese Publication No. JP2005-176272 A. (11 pages).

Office Action dated Aug. 4, 2010, U.S. Appl. No. 11/904,826.

Office Action dated Dec. 23, 2010 U.S. Appl. No. 11/904,826.

* cited by examiner

IMAGE DISPLAY CONTROLLING DEVICE FOR DISPLAYING AN IMAGE BELONGING TO A FILE IMAGE GROUP, IMAGING DEVICE FOR DISPLAYING AN IMAGE BELONGING TO A FILE IMAGE GROUP, AND IMAGE DISPLAY METHOD FOR DISPLAYING AN IMAGE BELONGING TO A FILE IMAGE GROUP

BACKGROUND OF THE INVENTION

1. Field of the Invention

The present invention relates to image display controlling devices, imaging devices, and image display methods.

2. Description of the Related Art

In a type of proposed imaging device, a lossless-compressed RAW file and a JPEG file generated from the RAW file and lossy-compressed are stored in a memory and these files are displayed (e.g., Japanese Unexamined Patent Application Publication No. 2005-33468).

SUMMARY OF THE INVENTION

In the imaging device described in Japanese Unexamined Patent Application Publication No. 2005-33468, for example, a RAW file and a JPEG file generated from the RAW file are handled as a set of image files, and only an image of either the RAW file or the JPEG file is displayed on a screen for selecting an image file. In this case, for example, when a user selects an image displayed, even if the user wishes to select the RAW file or the JPEG file individually, in some cases, the user is allowed only to select the RAW file and the JPEG file together. Furthermore, even when one image is displayed, for example, it is not allowed to recognize the content or the like of the individual RAW file and JPEG file. Furthermore, since the image quality of a JPEG file depends on a processing condition of development from a RAW file, in some cases, the user re-develops a RAW file into a JPEG file, for example, when the user does not like the image quality of a displayed image. In such cases, the user is not allowed to recognize or determine which file the displayed image is based on. On the other hand, for example, in the case of an image file viewer device that displays image files stored in a memory, a RAW file and a JPEG file generated from the RAW file are handled as separate images, so that in sane cases, too many corresponding images are displayed on a screen for selecting an image file. This makes it difficult for the user to find a desired file.

The present invention has been made in view of the problems described above, and it is an object thereof to provide an image display controlling device, an imaging device, an image display method, and a program of the image display method with which the user can readily find a desired file and with which the user can readily recognize the content of an image file group including two or more image files.

In order to achieve the object described above, the present invention employs the following scheme.

The present invention provides an image display controlling device including a display unit capable of displaying an image; an acquisition module that acquires an image file from a storage module; a determination module that determines whether the acquired image file belongs to an image file group including two or more image files, each of the two or more image files being an original image file or a generated image file generated from the original image file; and a control module that displays on the display unit an image corresponding to one of the image files belonging to the image file group when it is determined by the determination module that the acquired image file belongs to the image file group, in such a manner that a user is allowed to select the image, and that displays on the display unit information regarding the image file group in a visually recognizable manner.

In the image display controlling device, it is checked whether a stored image file belongs to an image file group including two or more image files including at least one of an original image file and a generated image file generated from the original image file. If it is determined that the stored image file belongs to the image file group, an image corresponding to one of the image files belonging to the image file group is displayed in such a manner that a user is allowed to select the image, and information regarding the image file group is displayed in a visually recognizable manner. Since only one image among a plurality of images in an image file group is displayed, the user can readily find a desired file. Furthermore, since information regarding the image file group is displayed, the user can readily recognize the content of the image file group.

In the image display controlling device of the invention, the control module may display on the display unit an image of an image file determined by the determination module as belonging to the image file group and an image of a single image file determined by the determination module as not belonging to the image file group, in mutually different modes. In this case, the control module may display on the display unit an image of an image file belonging to the image file group, an image of an original image file not included in the image file group, and an image of a generated image file not belonging to the image file group in mutually distinguishable modes using different colors.

In the image display controlling device of the invention, the determination module may determine whether the acquired image file belongs to an image file group including a RAW file and a JPEG file, the RAW file being a pre-development, uncompressed or lossless-compressed file that serves as the original image file, and the JPEG file being a post-development lossy-compressed file that serves as the generated image file. The storage module may store a RAW file which is a pre-development, uncompressed or lossless-compressed file that serves as the original image file, and a JPEG file which is a post-development lossy-compressed file that serves as the generated image file.

In the image display controlling device of the invention, in displaying on the display unit information regarding the image file group in the visually recognizable manner, the control module may display on the display unit at least one of information regarding a device used for imaging of the original image file included in the image file group, information regarding a device used for imaging of the generated image file, and information regarding a device used for generation of the generated image file, the information being represented by text, graphics, or symbols.

In the image display controlling device of the invention, in displaying on the display unit information regarding the image file group in the visually recognizable manner, the control module may display on the display unit information regarding which of the image files the displayed image is based on among the image files belonging to the image file group.

The image display controlling device of the invention may further include an instruction acquisition module that acquires from the user an instruction for starting selection of an image file on which a predefined processing is to be executed, and the determination module may check whether the image file stored in the storage module belongs to the image file group after the instruction acquisition module has obtained the instruction for starting selection of an image file. In this case, the control module may display information that allows the user to select one of deletion of an image file, copying of an image file, moving of an image file, and printing of an image file, and generation of a generated image file as the predefined processing.

In the image display controlling device of the invention, the control module may display on the display unit an image corresponding to one of the image files belonging to the image file group when the number of images displayed on the display unit exceeds a predetermined permissible number, in such a manner that the user is allowed to select the image, and display on the display unit information that allows the user to select an image file on which predefined processing is to be executed among the image files belonging to the image file group, the information being represented by text, graphics, or symbols. In the image display controlling device of the invention, the control module may include a buffer module that temporarily stores information of the image file stored in the storage module, and the control module may display on the display unit an image corresponding to one of the image files belonging to the image file group when the amount of information stored in the buffer module exceeds a predetermined permissible storage amount, in such a manner that the user is allowed to select the image, and display on the display unit information that allows the user to select an image file on which predefined processing is to be executed among the image files belonging to the image file group, the information being represented by text, graphics, or symbols.

The present invention also provides an imaging device including: an imaging module capable of capturing an image of an object; an image-file creating module that creates an image file from information of the image captured by the imaging module and that stores the image file in a storage module; and the image display controlling device of the invention described above.

The present invention also provides an image display method using a display unit capable of displaying an image and a storage module capable of storing an image file, including the steps of: (a) determining whether the acquired image file belongs to an image file group including two or more image files, each of the two or more image files being an original image file or a generated image file generated from the original image file; and (b) displaying on the display unit an image corresponding to one of the image files belonging to the image file group when it is determined by the step (a) that the acquired image file belongs to the image file group, in such a manner that a user is allowed to select the image, and that displays on the display unit information regarding the image file group in a visually recognizable manner. In this image display method, any application described above in connection with the image controlling display device of the invention may be employed, and any additional step may be added to achieve respective functions of the image display controlling device of the invention described above.

The present invention is also actualized as a program that causes one or multiple computers to execute the respective steps of the image display method of the invention described above. The program may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form. By causing a single computer execute all the procedures or multiple computers share execution of the procedures, the respective steps of the image display method are executed so as to achieve the same effects as those by the image display method.

DESCRIPTION OF THE PREFERRED EMBODIMENTS

Figure 1:
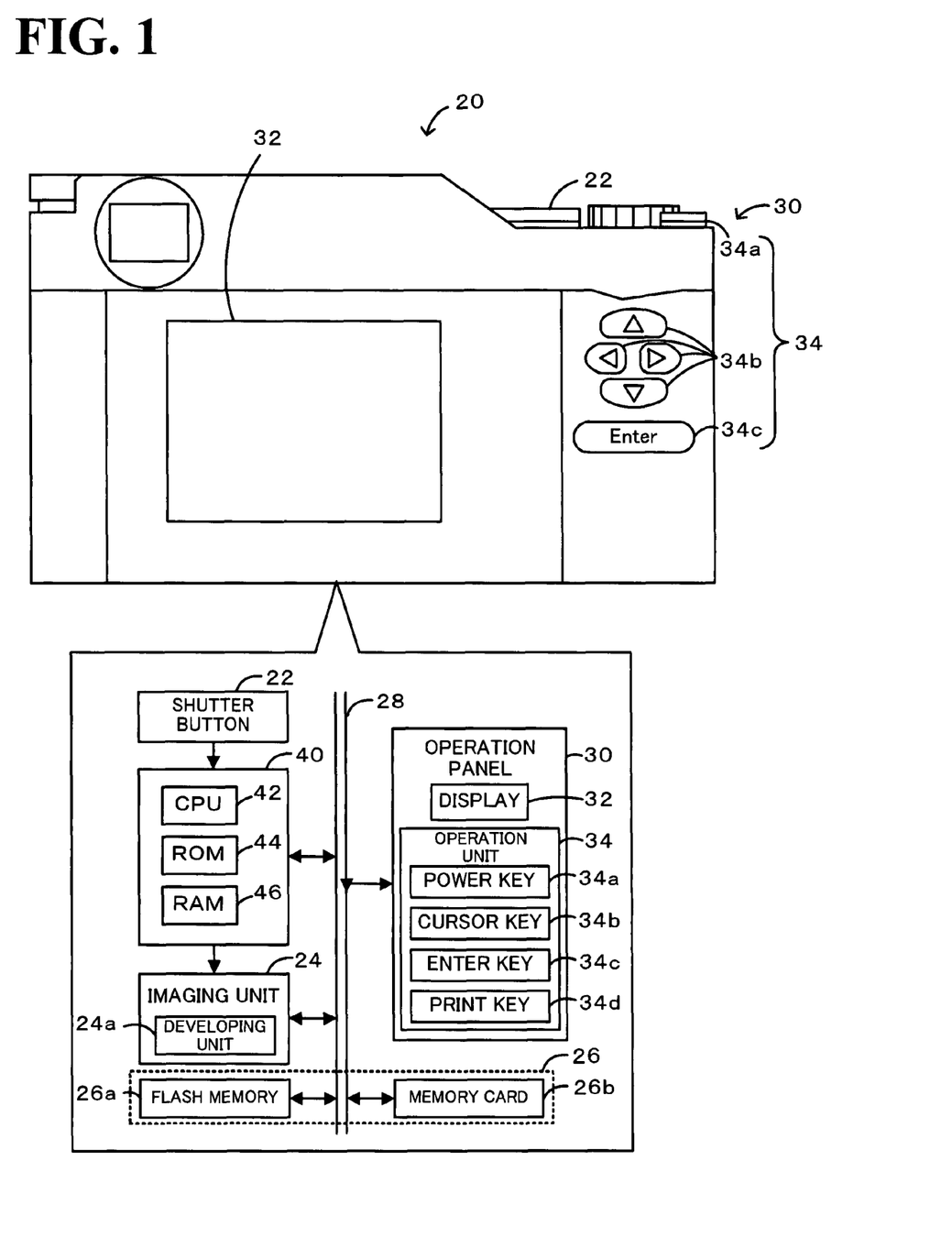
FIG. 1 is a diagram schematically showing the configuration of a digital camera according to an embodiment of the present invention.
Figure 2:
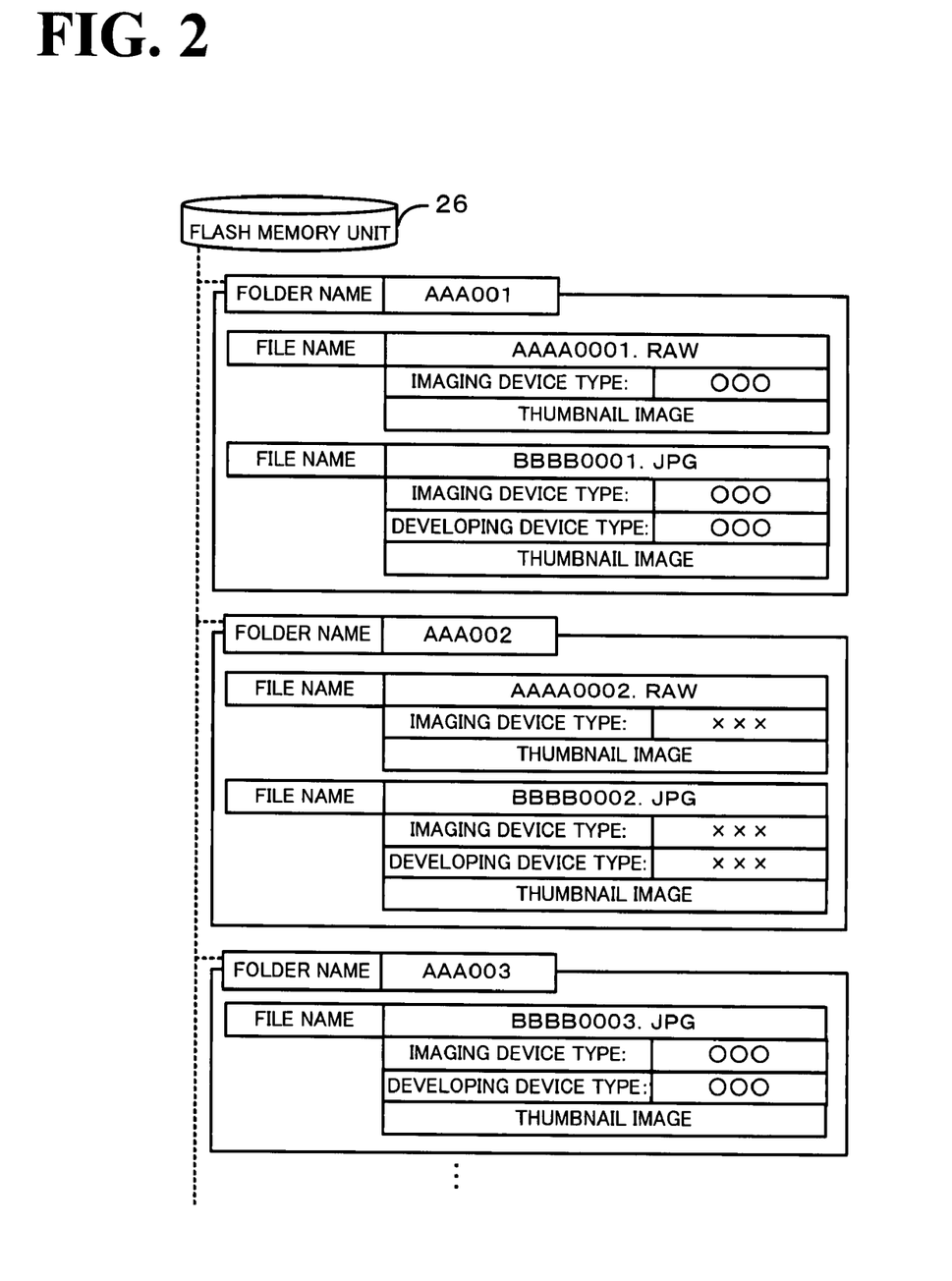
FIG. 2 is a diagram showing information stored in a flash memory unit.

Next, embodiments of the present invention will be described with reference to the drawings. FIG. 1 is a diagram schematically showing the configuration of a digital camera 20 according to an embodiment of the present invention. FIG. 2 is a diagram showing information stored in a flash memory unit 26. The digital camera 20 includes an imaging unit 24, a flash memory unit 26, an operation panel 30, and a controller 40. The imaging unit 24 captures an image of an object in response to pressing of a shutter button 22 and creates an image file on the basis of captured image information. The flash memory unit 26 is a non-volatile storage medium for storing the image file created by the imaging unit 24. The operation panel 30 can display various types of information and allows a user to input various instructions. The controller 40 controls the overall operation of the digital camera 20. The controller 40 is electrically connected to the imaging unit 24, the flash memory unit 26, and the operation panel 30 via a bus 28.

In the imaging unit 24, a shutter (not shown) is driven in response to pressing of the shutter button 22 so that light reflected by an object is input through a lens. The input light undergoes photoelectric conversion by an imaging element such as a charge coupled device (CCD), and a developing unit 24a creates an image file on the basis of electric signals obtained through the photoelectric conversion. The imaging unit 24 can be implemented by a unit having a known configuration. In this embodiment, the imaging unit 24 is configured so that the imaging unit 24 can generate a RAW file on the basis of the electric signals, the RAW file being a non-compressed or lossless-compressed image file before development, and so that the imaging unit 24 can generate a JPEG file on the basis of the electric signals, the JPEG file being a lossy-compressed image file after development, obtained by executing known image processing (e.g., white balancing or gamma correction) on the RAW file by the developing unit 24a. When capturing an image with the digital camera 20, the user can select either an original-image storing mode or a storage saving mode. In the original-image storing mode, a RAW file and a JPEG file generated from the RAW file are both stored. In the storage saving mode, only the JPEG file is stored. Although a JPEG file is generated from a RAW file in this embodiment, alternatively, a JPEG file and a RAW file may be generated directly from electric signals obtained by the imaging element.

The flash memory unit 26 includes a non-volatile flash memory 26a fixed to a main unit of the digital camera 20, and a portable memory card 26b that can be attached to or detached from the main unit of the digital camera 20. As shown in FIG. 2, the flash memory unit 26 stores image files representing images captured by the imaging unit 24. Each JPEG file is assigned a file name including a four-digit number immediately succeeding a number included in the file name of the last created image file. Each RAW file is assigned a file name including a four-digit number that is the same as a number included in the file name of a corresponding JPEG file generated. These image files are sequentially stored in a folder having a folder name including a three-digit number immediately succeeding a number included in the folder name of the last created folder. Furthermore, in each RAW file, information regarding a device used for imaging (e.g., a manufacturer name, a device name, etc.) is stored. Furthermore, depending on the type of the device used for imaging, thumbnail images developed by the imaging device are stored. In each JPEG file, information regarding a device used for imaging, information regarding a device used for developing, thumbnail images, and so forth are stored. In this embodiment, when a RAW file before development and a JPEG file obtained by developing the RAW file are stored, the RAW file and the JPEG file are referred to as "image files belonging to an image file group". When only either a RAW file or a JPEG file is stored, the image file is referred to as a "single image file". Furthermore, in the digital camera 20, a RAW file and a JPEG file generated from the RAW file are stored in the same folder. When only either a RAW file or a JPEG file is stored, the file is stored alone in one folder. As described above, regarding an image captured or developed by the digital camera 20, it is possible to recognize whether an image file belongs to an image file group on the basis of the numbers in the folder name and the file name. In this embodiment, the flash memory unit 26 also stores image files of images captured or developed by other imaging devices. The flash memory unit 26 may be alternatively composed of only either one of the flash memory 26a fixed to the main unit and the portable memory card 26b.

The operation panel 30 is a device that allows the user to input various instructions to the digital camera 20. The operation panel 30 has a display 32 that displays text, graphics or symbols, and images according to various instructions, and an operation unit 34 for executing various operations. The display 32 is implemented by a liquid crystal panel that displays color images. The operation unit 34 includes a power key 34a that is pressed when activating or deactivating the digital camera 20, a cursor key 34b that is pressed when the user moves a cursor or the like for selecting processing, text, or the like, an enter key 34c that is pressed when the user fixes selection of processing or the like, and a print key 34d that is pressed to instruct that an image be printed by a printing device (not shown) connected to the digital camera 20 via a cable. Furthermore, although not shown, the operation unit 34 includes a back key that is pressed when canceling selected processing or the like, a display switching key that is pressed when switching screens, a menu key that is pressed when displaying a menu screen for various settings, and so forth.

The controller 40 is implemented as a microprocessor including a central processing unit (CPU) 42 as a main component. In addition to the CPU 42, the controller 40 includes a read-only memory (ROM) 44 for storing processing programs, a random access memory (RAM) 46 for temporarily storing data, and an input/output port and a communication port (not shown). The controller 40 receives input of pressing signals from the shutter button 22, various signals from the imaging unit 24, various types of data read from the flash memory unit 26, input signals from the operation unit 34 of the operation panel 30, and so forth. Furthermore, the controller 40 outputs driving signals to the imaging unit 24, development instructions to the developing unit 24a, request signals for various types of data to the flash memory unit 26, display signals to the display 32 of the operation panel 30, and so forth.

Figure 3:
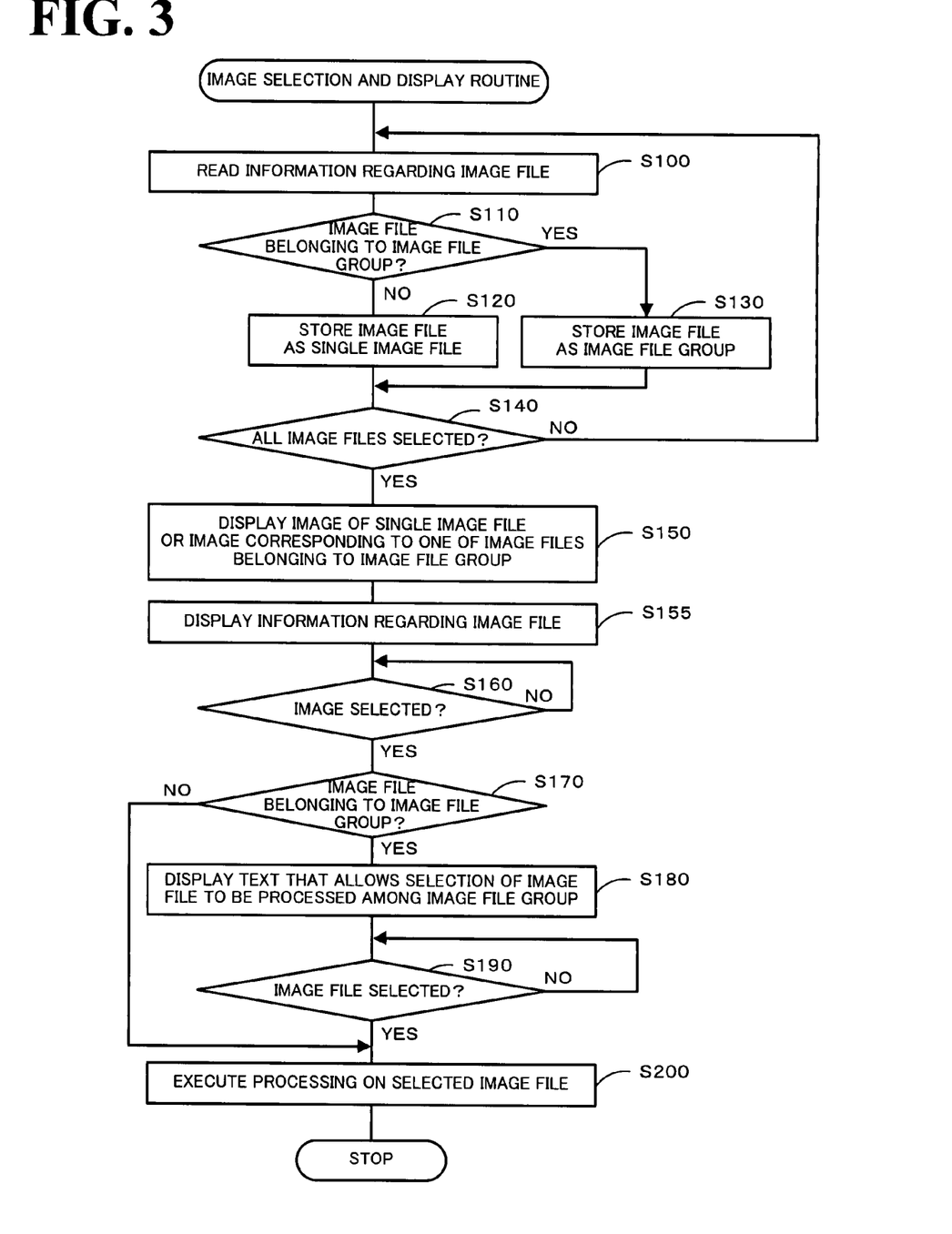
FIG. 3 is a flowchart showing an example of an image selection and display routine.

Next, an operation of the digital camera 20 according to this embodiment will be described. Particularly, an operation for displaying an image stored in the flash memory unit 26 and executing predefined processing, deletion in this example, will be described. FIG. 3 is a flowchart showing an example of an image selection and display routine executed by the CPU 42 of the controller 40. This routine is stored in the ROM 44, and is executed when "Delete image file" in a menu screen (not shown) is selected by a user's operation of the operation unit 34. Upon the start of the routine, the CPU 42 first reads information regarding an image file stored in the flash memory unit 26, such as a file name of the image file, a name of a device used for imaging, a name of a device used for development, or the presence or absence of thumbnail images (step S100), and checks whether the image file belongs to an image file group (step S110). Whether the image file belongs to an image file group can be determined on the basis of whether a JPEG file and a RAW file are included in the same folder, or whether a JPEG file and a RAW file have file names including the same number. If the image file does not belong to any image file group, the CPU 42 stores the image file in the RAM 46 as a single image file (step S120). If the image file belongs to an image file group, the CPU 42 stores the image file in the RAM 46 as one of the files belonging to the image file group, i.e., as either a RAW file or a JPEG file generated from the RAW file (step S130). Then, the CPU 42 checks whether all the image files have been read from the flash memory unit 26 (step S140). If all the image files have not been read, step S100 and the subsequent steps are repeated. If all the image files have been read, the CPU 42 displays on the display 32 an image selection screen 80 that allows selection of an image by the user (step S150). In the image selection screen 80, for each single-image file, an image corresponding to the single image file is displayed, and for each image file group, an image corresponding to one of the image files included in the image file group is displayed. Furthermore, information regarding the image file, such as a name of a device used for imaging or development, on the display 32 in a visually recognizable manner (step S155).

Figure 4:
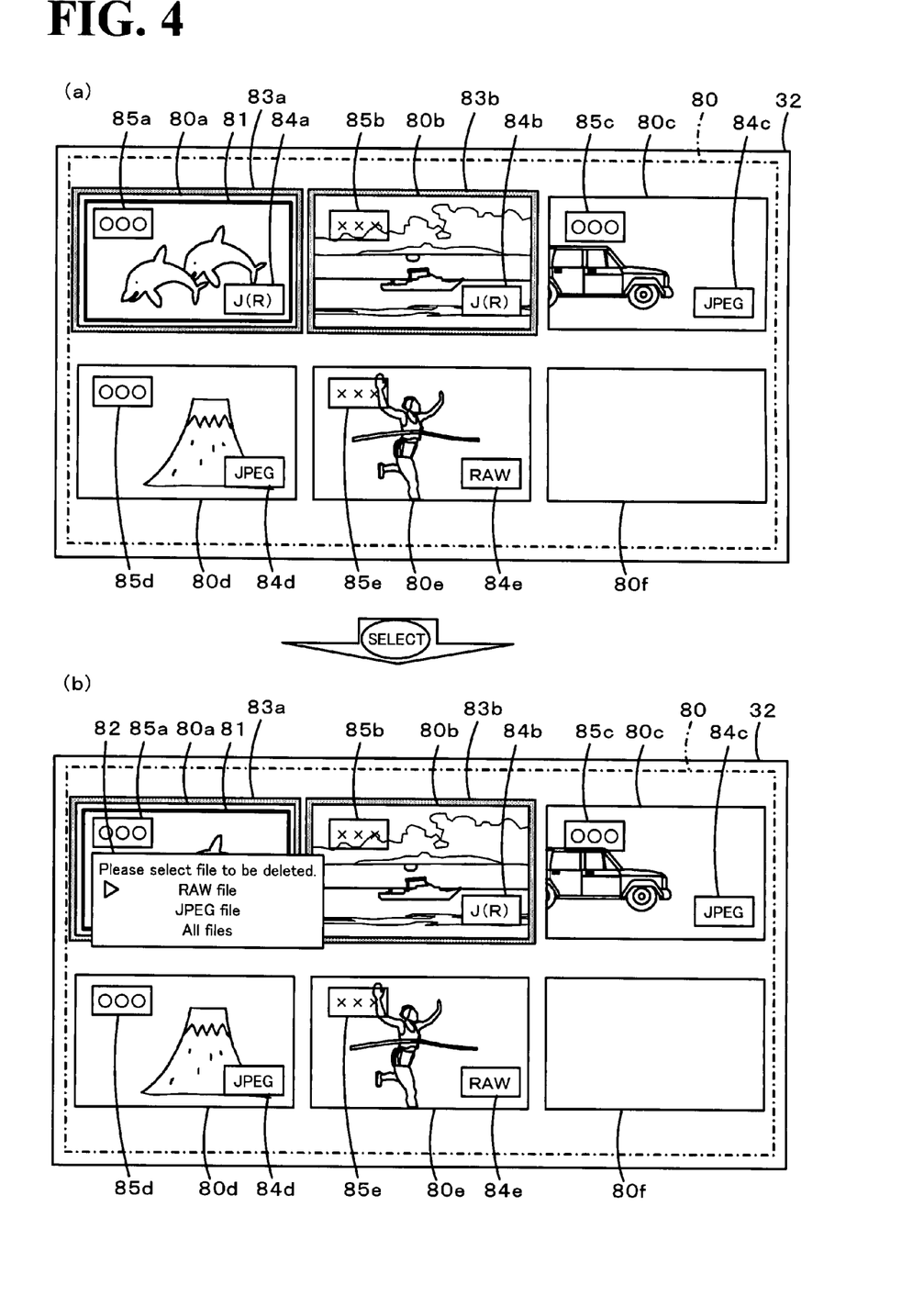
FIG. 4 is an illustration of an image selection screen displayed on a display, in which part (a) shows a state before image selection and part (b) shows a state after image selection.

FIG. 4 is an illustration showing the image selection screen 80 displayed on the display 32. In FIG. 4, part (a) shows a state before image selection, and part (b) shows a state after image selection. In the image selection screen 80, images 80a to 80f that serve as thumbnail images of individual image files are arranged in three columns and two rows, and a cursor 81 is moved according to pressing of the right or left key of the cursor key 34b so that a next page or a previous page of images is displayed. Furthermore, in the image selection screen 80, an image of an image file group is displayed in a mode different from a mode of display of an image of a single image file. In this example, the image 80a is displayed with a surrounding frame 83a, and the image 80b is displayed with a surrounding frame 83b (the frames 83a, 83b, and so forth will be referred to collectively as frames 83). As an image of an image file group, a thumbnail image based on a JPEG file is used as the first choice, a thumbnail image based on a RAW file is used as the next choice, and when neither of these thumbnail images is available, a thumbnail image is created from a JPEG file or a RAW file and the thumbnail image is displayed. When creating a thumbnail image from a RAW file, the RAW file is developed in the developing unit 24a. If the development in the developing unit 24a does not succeed, no corresponding thumbnail image is displayed in the image selection screen 80. In the image selection screen 80, displayed-image information areas 84a to 84e (collectively referred to as displayed-image information areas 84) showing text indicating file types corresponding to the displayed images, and developing-device information areas 85a to 85e (collectively referred to as developing-device information areas 85) showing text indicating devices used to develop the displayed devices are provided above the images 80a to 80f, respectively. For example, regarding the image 80a, the displayed-image information area 84a showing "J(R)" is provided on the lower right side thereof. Of "J(R)" in the displayed-image information area 84a, "J" indicates that the displayed image is a thumbnail image of a JPEG file, and "(R)" indicates that a RAW file is stored in the flash memory unit 26 in addition to the JPEG file. "JPEG" in the displayed-image information area 84c indicates that only a JPEG file is stored in the flash memory unit 26 and that the displayed image is a thumbnail image of the JPEG file. "RAW" in the displayed-image information area 84e indicates that only a RAW file is stored in the flash memory unit 26 and that the displayed image is a thumbnail image of the RAW file. As described above, in the image selection screen 80, information needed by the user in relation to the individual displayed images are displayed in a readily recognizable manner. Although the displayed images are thumbnail images, the user is allowed to recognize, for example, difference in image quality depending on devices used for development.

After step S150, the CPU 42 checks on the basis of pressing of the enter key 34c whether an image displayed in the image selection screen 80 has been selected (step S160). If no image has been selected, the CPU 42 keeps waiting. If an image has been selected, the CPU 42 checks whether the selected image is an image belonging to an image file group (step S170). If the selected image is an image belonging to an image file group, the CPU 42 displays on the display 32 a selection menu showing text asking the user to select an image file that is to be deleted among the image file group (step S180), as shown in part (b) of FIG. 4. The selection menu 82 is a pull-down menu that allows selection of deletion of a RAW file, deletion of a JPEG file, or deletion of all files.

Then, the CPU 42 checks on the basis of pressing of the enter key 34c whether an image file has been selected by selecting one of the options in the selection menu 82 (step S190). If no image file has been selected, the CPU 42 keeps waiting. On the other hand, if an image file has been selected, or if it is determined in step S170 that the selected image is an image not belonging to any image file group, i.e., when the selected image is an image of a single image file, the selected image file is deleted (step S200). The CPU 42 then exits the routine. In step S200, a RAW file is deleted when "RAW file" is selected, a JPEG file is deleted when "JPEG file" is selected, and both a RAW file and a JPEG file are deleted when "All files" is selected.

Now, the corresponding relationship between the elements in this embodiment and elements in the present invention will be described. The display 32 in this embodiment corresponds to a display unit in the present invention, the flash memory unit 26 corresponds to a storage module, the operation unit 34 corresponds to a selection module, the imaging unit 24 corresponds to an imaging module and an image-file creating module, and the CPU 42 corresponds to a determination module, an instruction acquisition module, and a control module. This embodiment also demonstrates an example of an image display method according to the present invention through description of the operation of the digital camera 20.

With the digital camera 20 according to this embodiment described above in detail, it is checked whether a stored image file belongs to an image file group including a RAW file and a JPEG file generated by developing the RAW file. If it is determined that the image file belongs to the image file group, a thumbnail image based on the JPEG file among the image files belonging to the image file group is displayed with a frame 83 so as to be distinguishable from a thumbnail image of a single image file in the image selection screen 80 that allows selection of an image by the user. Furthermore, text information regarding the image file group or the single image file, such as displayed-image information areas 84 including information indicating file types corresponding to the displayed images, developing-device information areas 85 including names of devices used for development, is displayed for the individual displayed images. As described above, since only one image among a plurality of images in an image file group is displayed, the user can readily find a desired file compared with a case where a plurality of corresponding files is displayed. Furthermore, since information regarding the image file group is displayed, the user can readily recognize the content of the image file group or a single image file. Since a JPEG file is often generated by developing and compressing a RAW file, a JPEG file and a RAW file often represent images of the same object. Therefore, application of the present invention to RAW and JPEG images is effective. Furthermore, the user is allowed to recognize devices used for imaging or development of the individual files. For example, this serves to determine whether a JPEG file is to be re-developed. Furthermore, information indicating which of the image files the displayed image is based on is displayed. Thus, the user can recognize which of the image files the image quality of the displayed image is attributable to. Furthermore, an image belonging to an image file group is displayed with a frame 83 so as to be distinguishable from an image of a single image file, the user can readily recognize visually whether the displayed image corresponds to a single image file or to an image file group including two or more image files.

Furthermore, since text that allows the user to select an image file to be deleted among the image file group is displayed, the user can select individual files belonging to the image file group. Furthermore, since the selection menu 82 is displayed upon user's selection of an image in the image selection screen 80, the user can readily select an image belonging to an image file group or an image of a single image file. Furthermore, whether an image file belongs to an image file group is checked after receiving an instruction for starting selection of an image file to be deleted according to a user's operation of the display 34, so that images corresponding to image files for selection can be displayed at a timing desired by the user. Furthermore, application of the present invention to deletion of an image file is effective since deletion of an image file is often executed after displaying images and selecting one of the images. Furthermore, since it suffices to display only one image for an image file group, it is possible to save use of the resource of the RAM 46, so that processing can be executed smoothly.

The present invention is not limited in any way to the embodiment described above, and various modifications and alternatives can be conceived within the technical scope of the present invention.

For example, in the embodiment described above, the displayed-image information areas 84 and the developing-device information areas 85 are displayed using text. Alternatively, the displayed-image information areas 84 and the developing-device information areas 85 may be displayed using symbols or images (e.g., predefined icons) or the like. This also allows the user to visually recognize information of the displayed images.

Figure 5:
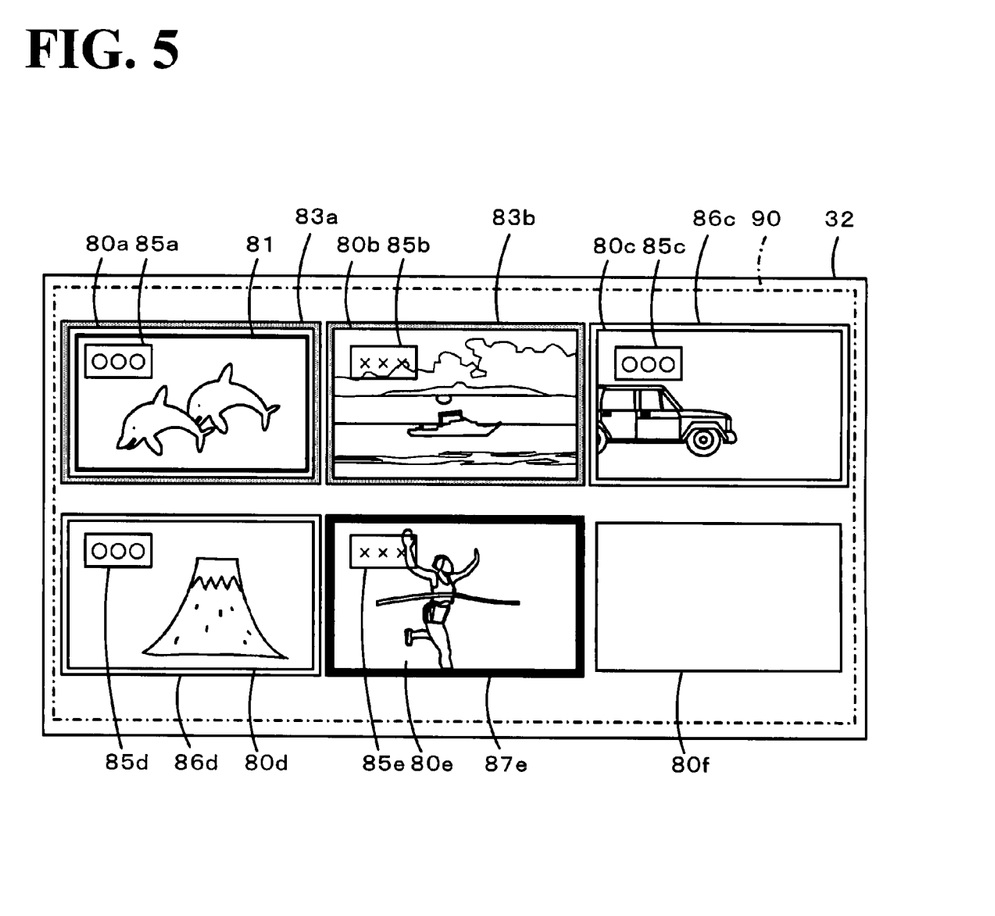
FIG. 5 is an illustration of another image selection screen displayed on the display unit.

In the embodiment described above, the frame 83 is used to indicate that a displayed image belongs to an image file group, and the displayed-image information area 84 is used to indicate a file type corresponding to the displayed image. Alternatively, it is possible to display an image with a surrounding JPEG frame 86 (JPEG frames 86c and 86d) having a color (white in this example) different from the color of the frame 83 when the displayed image corresponds to a single-image file and is based on a JPEG file, and to display an image with a surrounding RAW frame 87 (RAW frame 87e) having a color (black in this example) different from the colors of the frame 83 and the frame 86 when the displayed image corresponds to a single-image file and is based on a RAW file, as shown in FIG. 5. FIG. 5 is an illustration of an image selection screen 90 displayed on the display 32. Also in this case, the user can readily recognize by color whether a displayed image corresponds to an image file group or a single image file. Alternatively, instead of using the frames 83, the JPEG frames 86, and the RAW frame 87, the colors of the developing-device information areas 85 may be varied as defined in advance according to the types of the individual original images that are displayed.

Figure 6:
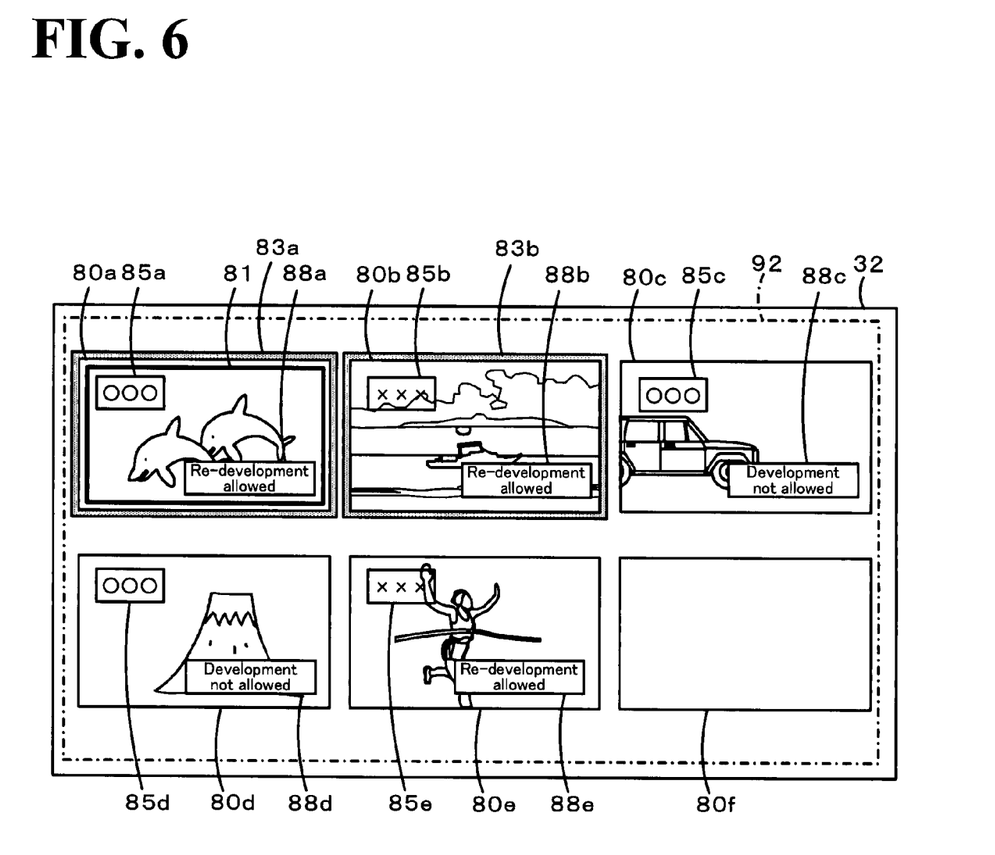
FIG. 6 is an illustration of yet another image selection screen displayed on the display unit.
Figure 7:
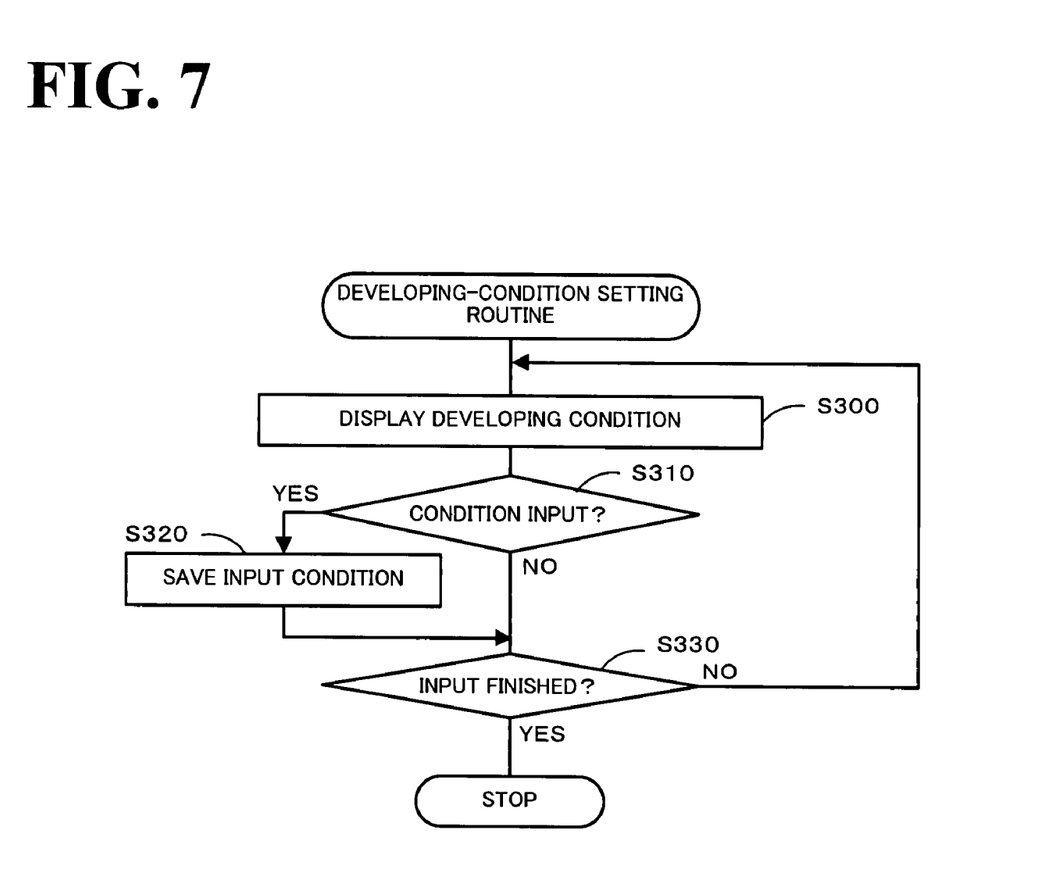
FIG. 7 is a flowchart showing an example of a developing-condition setting routine.

In the embodiment described above, in the displayed-image information areas 84, text such as "J(R)", "JPEG", or "RAW" is displayed. When a RAW file exists, it is possible to newly develop a JPEG file by the developing unit 24a using the RAW file. Thus, in displayed-image information areas 88, it is possible to display "Re-development allowed" for an image for which a RAW file is stored (displayed-image information areas 88a, 88b, and 88e), and to display "Development not allowed" for an image for which a RAW file is not stored (displayed-image information areas 88c and 88d), as shown in FIG. 6. FIG. 6 is an illustration of an image selection screen 92 displayed on the display 32. This allows the user to find images for which JPEG files can be re-developed. The digital camera 20 may be configured so that the user is allowed to input, by operations of the operation unit 34, developing conditions such as a method of pixel interpolation between imaging elements, a white balancing condition, or a gamma correction condition, so that a JPEG file can be generated from a RAW file according to the developing conditions input by the user. FIG. 7 is a flowchart showing an example of a developing-condition setting routine. This routine is stored in the ROM 44, and is executed by the CPU 42 when "Setting of developing conditions" is selected in a menu screen (not shown) and then the enter key 34c is pressed. Upon the start of the routine, the CPU 42 displays a developing-condition setting screen (not shown) on the display 32, the developing-condition setting screen allowing input of values of developing conditions for image development (step S300). The developing conditions include, for example, conditions for optical black processing for reducing a black signal level to zero by subtracting a value of an optical black level, white balancing for correcting variation in color due to a light source used for imaging, pixel interpolation for interpolating color information between pixels, resizing for changing the size of an image, color reproduction for adjusting the color balance of a captured image, sharpening for enhancing edges of an image, and gamma correction for adjusting image contrast and correcting tones appropriately in accordance with the characteristics of an output destination of the image. Then, the CPU 42 checks whether a value has been input by a key operation (step S310). If a value has been input, the CPU 42 saves the value in the flash memory 26a (step S320). After step S320, or if no developing condition has been input in step S310, the CPU 42 checks whether the input operation has been finished on the basis of whether an input completion button (not shown) has been selected (step S330). If the input operation has not been finished, the CPU 42 executes step S300 and the subsequent steps. If the input operation has been finished, the CPU 42 exits the routine. As described above, the user is allowed to set parameters for developing a RAW file into a JPEG file. When the user sets the parameters, an image generated on the basis of the parameters input by the user may be displayed on the display 32. This allows the user to check how changes in the values of the parameters are reflected on the image. This allows more effective use of RAW files, and the user can achieve a more suitable image quality by checking the image quality on the display 32.

In the embodiment described above, the frames 83, the displayed-image information areas 84, and the developing-image information areas 85 are displayed. However, as long as at least one of these information is displayed, other information need not necessarily be displayed. Also in this case, the user can readily recognize the content of the image file group.

In the embodiment described above, information regarding devices used for developing displayed images are displayed in the developing-device information areas 85 on the display 32. Alternatively or in addition, information regarding devices used for imaging of the displayed images may be displayed on the display 32. Furthermore, alternatively or in addition, when a displayed image belongs to an image file group, information indicating a device used for imaging of a RAW file may be displayed on the display 32. Accordingly, the user can obtain even more information, so that the user can even more readily recognize the content of an image file group or a single image file. In the embodiment described above, a thumbnail of a JPEG file is used as a first choice of an image displayed on the display 32. Without limitation, however, a thumbnail image of a RAW file may be used as the first choice.

In the embodiment described above, an image corresponding to one of the image files belonging to an image file group is displayed on the display 32 in such a manner that the user is allowed to select the image. Without limitation to deletion of an image file, also in copying, moving, or printing of an image file or developing of a RAW file, it is possible to display only an image corresponding to one image file among the image files belonging to the image file group. Copying, moving, or printing of an image file or developing of a RAW file is often executed after displaying a plurality of images and then selecting one of the images, so that application of the present invention is effective.

In the embodiments described above, only an image corresponding to one image file among the image files belonging to the image file group is displayed and text that allows the user to select one of the image files is displayed in response to an instruction for starting selection of an image file that is to be deleted according to a user's operation of the operation unit 34. However, the present invention is not limited to the embodiments. For example, it is possible to display only an image corresponding to one image file among the image files belonging to the image file group and to display text that allows the user to select one of the image files when the amount of information of image files stored in the RAM 46, which temporarily stores information of image files stored in the flash memory unit 26, has exceeded a predetermined permissible amount of storage (e.g., 80% of the capacity). Yet alternatively, it is possible to display only an image corresponding to one image file among the image files belonging to the image file group when the amount of information stored in the flash memory unit 26 has exceeded a predetermined permissible amount of storage (e.g., 80% of the capacity). This also allows the user to readily find a desired file. Furthermore, since the amount of information stored in the RAM 46 or the flash memory unit 26 can be saved, processing for display or deletion can be executed smoothly. Alternatively, it is possible to display only an image corresponding to one image file among the image files belonging to the image file group and to display text that allows the user to select one of the image files when the number of images that are to be displayed on the display 32 exceeds a predetermined permissible number. The "predetermined permissible number" refers to, for example, a maximum number of images that can be displayed in one page on the display 32. This inhibits the number of images from exceeding the permissible number. That is, this inhibits image display from spanning two or more pages, and the number of images displayed is reduced. Thus, the user can find a desired file efficiently.

Although the embodiments have been described above in the context of the digital camera 20, without limitation, the present invention can also be applied to other devices that display an image file belonging to an image file group. For example, the present invention can be applied to a picture viewer, a digital video, or a camera-equipped cellular phone that is capable of reproducing images, or a printing apparatus having a display, such as a printer or a facsimile machine. Although the description has been given using RAW files and JPEG files as image files, other image files may be used, such as BMP files or TIFF files. Furthermore, although the selection menu 82 displays options in text, alternatively, options may be displayed using symbols or graphics. Furthermore, although the present invention is embodied in the form of the digital camera 20 in the embodiments, the present invention may be embodied in the form of an image display method or a program of the image display method.

The present application claims priority from Japanese Patent Application No. 2006-264473 filed on Sep. 28, 2006 and Japanese Patent Application No. 2007-185814 filed on Jul. 17, 2007, the entire contents of both of which are incorporated herein by reference.

What is claimed is:

1. An image display controlling device comprising:
a display unit capable of displaying an image;
an acquisition module that acquires an image file from a storage module;
a determination module
that determines whether the acquired image file belongs to an image file group including two or more image files, each of the two or more image files being an original image file and a generated image file generated from the original image file,
that determines whether the acquired image file is a generated single image file which does not have a corresponding original image file stored in the storage module, and
that determines whether the acquired image file is an original single image file which does not have a corresponding generated image file stored in the storage module; and
a control module
that displays on the display unit an image corresponding to only one of the image files belonging to the image file group in a visually recognizable manner when it is determined by the determination module that the acquired image file belongs to the image file group,
that displays on the display unit an image corresponding to the acquired image file as an original single image file in a visually recognizable manner when it is determined by the determination module that the acquired image file is an original single image file, and
that displays on the display unit an image corresponding to the acquired image file as a generated single image file in a visually recognizable manner when it is determined by the determination module that the acquired image file is a generated single image file,
wherein the control module displays on the display unit the image corresponding to only one of the image files belonging to the image file group with an indicator, the image corresponding to the acquired image file as an original single image file with the indicator, and the image corresponding to the acquired image file as a generated single image file without the indicator.

2. The image display controlling device according to claim 1, wherein the control module displays on the display unit an image of an image file determined by the determination module as belonging to the image file group and an image of a single image file determined by the determination module as not belonging to the image file group, in mutually different modes.

3. The image display controlling device according to claim 2, wherein, in displaying on the display unit an image of the image file group and an image not belonging to the image file group in mutually different modes, the control module displays on the display unit an image of an image file belonging to the image file group, an image of an original image file not included in the image file group, and an image of a generated image file not belonging to the image file group in mutually distinguishable modes using different colors.

4. The image display controlling device according to claim 1, wherein the determination module determines whether the acquired image file belongs to an image file group including a RAW file and a JPEG file, the RAW file being a pre-development, uncompressed or lossless-compressed file that serves as the original image file, and the JPEG file being a post-development lossy-compressed file that serves as the generated image file.

5. The image display controlling device according to claim 1, wherein, in displaying on the display unit information regarding the image file group in the visually recognizable manner, the control module displays on the display unit at least one of information regarding a device used for imaging of the original image file included in the image file group, information regarding a device used for imaging of the generated image file, and information regarding a device used for generation of the generated image file, the information being represented by text, graphics, or symbols.

6. The image display controlling device according to claim 1, wherein, in displaying on the display unit information regarding the image file group in the visually recognizable manner, the control module displays on the display unit information regarding which of the image files the displayed image is based on among the image files belonging to the image file group.

7. The image display controlling device according to claim 1, further comprising an instruction acquisition module that acquires from the user an instruction for starting selection of an image file on which a predefined processing is to be executed, wherein the determination module checks whether the image file stored in the storage module belongs to the image file group after the instruction acquisition module has obtained the instruction for starting selection of an image file.

8. The image display controlling device according to claim 7, wherein the control module displays information that allows the user to select one of deletion of an image file, copying of an image file, moving of an image file, and printing of an image file, and generation of a generated image file as the predefined processing.

9. An imaging device comprising:
- an imaging module capable of capturing an image of an object;
- an image-file creating module that creates an image file from information of the image captured by the imaging module and that stores the image file in a storage module; and
- the image display controlling device according to claim 1.

10. The image display controlling device according to claim 1, wherein:
- the indicator comprises a color of a frame;
- the control module displays on the display unit the image corresponding to only one of the image files belonging to the image file group with a first frame having a first color;
- the control module displays on the display unit the image corresponding to the acquired image file as an original single image file with a second frame having the first color; and
- the control module displays on the display unit the image corresponding to the acquired image file as a generated single image file with a third frame having a second color different from the first color.

11. An image display method using a display unit capable of displaying an image and a storage module capable of storing an image file, comprising the steps of:
(a) determining whether an acquired image file belongs to an image file group including two or more image files, each of the two or more image files being an original image file and a generated image file generated from the original image file;
(b) determining whether the acquired image is a generated single image file which does not have a corresponding an original image file stored in the storage module;
(c) determining whether the acquired image file is an original single image file which does not have a corresponding generated image file stored in the storage module;
(d) displaying on the display unit an image corresponding to only one of the image files belonging to the image file group in a visually recognizable manner when it is determined by the step (a) that the acquired image file belongs to the image file group;
(e) displaying on the display unit an image corresponding to the acquired image file as an original single image file in a visually recognizable manner when it is determined by the step (a) that the acquired image file is an original single image file; and
(f) displaying on the display unit an image corresponding to the acquired image file as a generated single image file in a visually recognizable manner when it is determined by the step (a) that the acquired image file is a generated single image file,
wherein the image corresponding to only one of the image files belonging to the image file group is displayed with an indicator, the image corresponding to the acquired image file as an original single image file is displayed with the indicator, and the image corresponding to the acquired image file as a generated single image file is displayed without the indicator.

12. The image display controlling device according to claim 10, wherein:
- the indicator comprises a color of a frame,
- the image corresponding to only one of the image files belonging to the image file group is displayed with a first frame having a first color,
- the image corresponding to the acquired image file as an original single image file is displayed with a second frame having the first color, and
- the image corresponding to the acquired image file as a generated single image file is displayed with a third frame having a second color different from the first color.

* * * * *